United States Patent
Chan et al.

(10) Patent No.: US 8,081,972 B2
(45) Date of Patent: Dec. 20, 2011

(54) METHOD AND SYSTEM FOR SENSING DISCONTIGUOUS CHANNELS IN A WIRELESS NETWORK

(75) Inventors: Wing Chau Chan, New Territories (HK); Kwok Shum Au, Kowloon (HK); Rui Wang, Kowloon (HK); Tianyu Wu, Kowloon (HK); Kin Nang Lau, Kowloon (HK); Shu Kwan Cheng, Kowloon (HK); Ross David Murch, Kowloon (HK); Wai Ho Mow, Kowloon (HK)

(73) Assignee: Huawei Technologies Co., Ltd., Shenzhen (CN)

( * ) Notice: Subject to any disclaimer, the term of this patent is extended or adjusted under 35 U.S.C. 154(b) by 538 days.

(21) Appl. No.: 11/753,675

(22) Filed: May 25, 2007

(65) Prior Publication Data
US 2008/0293410 A1 Nov. 27, 2008

(51) Int. Cl.
*H04W 4/00* (2009.01)
*H04B 7/00* (2006.01)
*H04B 15/00* (2006.01)

(52) U.S. Cl. ............................. 455/434; 455/515; 455/62

(58) Field of Classification Search .................. 455/434, 455/454, 450, 447, 509, 515, 62; 370/329, 370/455, 465
See application file for complete search history.

(56) References Cited

U.S. PATENT DOCUMENTS

| | | | |
|---|---|---|---|
| 2008/0219286 A1* | 9/2008 | Ji et al. | 370/445 |
| 2008/0225789 A1* | 9/2008 | Kim et al. | 370/329 |
| 2008/0259811 A1* | 10/2008 | Cordeiro et al. | 370/252 |
| 2009/0016293 A1* | 1/2009 | Kang et al. | 370/329 |
| 2009/0161610 A1* | 6/2009 | Kang et al. | 370/329 |

OTHER PUBLICATIONS

"Draft Standard for Wireless Regional Area Networks Part 22: Cognitive Wireless RAN Medium Access Control (MAC) and Physical Layer (PHY) Specifications: Policies and Procedures for Operation in the TV Bands," IEEE P802.22/ D0.1, May 2006.

* cited by examiner

*Primary Examiner* — Lester Kincaid
*Assistant Examiner* — Kuo Woo
(74) *Attorney, Agent, or Firm* — Conley Rose, P.C.; Grant Rodolph

(57) ABSTRACT

A method for sensing channel availability in a wireless network includes receiving a measurement request message which includes a channel interval list. A first channel interval in the list includes information associated with a first starting channel number, a first number of channels, and first linkage information of the channel interval list. The method includes processing information associated with the message, generating a first list of contiguous channels, and performing at least first channel measurement to determine a first channel availability for each of the first list of contiguous channels. The method also includes determining whether the channel interval list further includes a second channel interval that needs to be processed based on at least first linkage information, and if needed, generating a second list of contiguous channels and performing at least second channel measurement to determine a second channel availability for each of the second list of contiguous channels.

14 Claims, 7 Drawing Sheets

METHOD AND SYSTEM FOR SENSING DISCONTIGUOUS CHANNELS IN A WIRELESS NETWORK

BACKGROUND OF THE INVENTION

The present invention is directed in general to wireless telecommunication techniques. More particularly, the invention provides a method and system for sensing noncontiguous channels in a wireless network. Merely by way of example, the invention has been applied to a Wireless Regional Area Network (WRAN) system as defined in the IEEE 802.22 standard. But it would be recognized that the invention has a much broader range of applicability. For example, the invention can be applied to other wireless communication systems utilizing noncontiguous channels.

The IEEE 802.22 Wireless Regional Area Network (WRAN) system is designed to operate in the VHF/UHF TV broadcast bands between 54-862 MHz. According to IEEE 802.22, the system is formed by base stations (BS's) and customer premise equipments (CPE's). In the context of this application, a BS refers to a generalized equipment set providing connectivity, management, and control of the CPE, and a CPE refers to a generalized equipment set providing connectivity between subscriber and a BS. For example, a CPE may include an Access Point (AP). In a WRAN, the CPE's will be attached to a BS via a wireless link in the frequencies mentioned above. FIG. 1 shows a diagram illustrating a WRAN cell 100 including a BS 101 and a plurality of CPE's. e.g. 102 and 103, etc. The BS controls the medium access for all the CPE's attached to it.

Because there are incumbent systems operating in the TV broadcast frequency bands, the system needs have the cognitive capability of detecting the presence and possibly the locations of these incumbent systems and perform dynamic frequency selection so as to avoid creating interference. A WRAN Base Station is capable of performing a distributed sensing, and the CPE's sense the spectrum and send reports to the BS informing it about what spectrum availability. Two different types of spectrum measurement are generally performed by the CPE, i.e., in-band and out-of-band. The in-band measurement includes sensing the actual channel that is being used by the BS and CPE, whereas the out-of-band measurement includes sensing the rest of the channels.

Distributed sensing is used so that the measurements of a plurality of sensors, which are consumer premise equipments (CPE's) and base stations (BS's), can be used to jointly estimate the locations of the incumbent systems. Generally, there are four MAC management messages used for sensing, namely,
  1. Bulk measurement request (BLM-REQ);
  2. Bulk measurement response (BLM-RSP);
  3. Bulk measurement report (BLM-REP); and
  4. Bulk measurement acknowledgement (BLM-ACK).

Using these four management messages, the sensing mechanism can be described as follows. When the BS requests one or more CPE's to sense a set of contiguous channel intervals, the BS transmits to those CPE's the BLM-REQ message, containing instructions on the type of measurements to be performed, as well as when and how long to perform. If the BS requires the CPE to acknowledge the receipt of the BLM-REQ message, this is done through the BLM-RSP message. The BLM-REP message then allows those CPE's to report back to the BS all measurement data they have collected as per the request in the BLM-REQ message. Finally, the BLM-ACK message is sent by the BS to those CPE's to confirm the receipt of the BLM-REP message.

Even though the conventional channel sensing method may be adequate in certain applications, there are various limitations, as discussed below. Therefore, an improved technique for channel sensing is desired.

BRIEF SUMMARY OF THE INVENTION

The present invention is directed in general to wireless telecommunication techniques. More particularly, the invention provides a method and system for sensing noncontiguous channels in a wireless network. Merely by way of example, the invention has been applied to a Wireless Regional Area Network (WRAN) system as defined in the IEEE 802.22 standard. But it would be recognized that the invention has a much broader range of applicability. For example, the invention can be applied to other wireless communication systems utilizing noncontiguous channels.

In accordance with an embodiment of the present invention, a method is provided for sensing channel availability in a wireless network. The method includes receiving a measurement request message, which includes a channel interval list. In an embodiment, the channel interval list includes at least a first channel interval, which includes several fields. For example, a first field is associated with a first starting channel number, a second field is associated with a first number of channels, and a third field is associated with first linkage information of the channel interval list.

According to embodiment of the invention, the method maybe applicable to many different wireless networks. As a specific example, the wireless network may an IEEE 802.22 Wireless Regional Area Network (WRAN). In this example, the measurement request message includes a bulk measure request (BLM-REQ) message. In an embodiment, BLM-REQ message includes a list of channel intervals, each of the channel intervals including an first field associated with a first starting channel number, a second field associated with a first number of channels, and a third field associated with first linkage information of the list of channel intervals. In a specific embodiment, the BLM-REQ message includes a list of channel intervals, each of the channel intervals including an first 8-bit field associated with a first starting channel number, a second 8-bit field associated with a first number of channels, and a 1-bit field associated with first linkage information of the list of channel intervals. Of course, there can be other variation, modifications, and alternatives.

In an embodiment, the method includes processing information associated with the measurement request message, and generating a first list of contiguous channels based on at least information associated the first field and the second field associated with the first channel interval in the channel interval list. At least a first channel measurement is performed to determine a first channel availability for each of the first list of contiguous channels. The method also determines whether the channel interval list further includes a second channel interval that needs to be processed based on at least first linkage information. If the channel interval list is determined to further include the second channel interval that needs to be processed, the method then generates a second list of contiguous channels and performs at least second channel measurement to determine a second channel availability for each of the second list of contiguous channels.

In a specific embodiment, the second channel interval includes a fourth field associated with a second starting channel number, a fifth field associated with a second number of channels, and a sixth field associated with second linkage information of the channel interval list. Here, if a second channel interval needs to be processed, a second list of contiguous channels is generated based on at least information associated the fourth field and the fifth field associated with the second channel interval. In processing the second channel interval, the method also includes determining whether the channel interval list further includes a third channel interval that needs to be processed based on at least second linkage information.

In another embodiment, method for sensing channel availability in a wireless network also includes sending a channel sensing report to a base station. In a specific embodiment, the wireless network is an IEEE 802.22 Wireless Regional Area Network (WRAN), and the channel sensing report is sent via is a bulk measure report (BLM-REP) message.

Many benefits are achieved by way of the present invention over conventional techniques. For example, the present invention provides techniques for sensing channel availability in a wireless network using a single measurement request message which is capable of specifying discontiguous channel intervals. The system overhead in communication can be substantially reduced. In a specific embodiment, the invention provides techniques for implementing noncontiguous channel sensing capability in IEEE 802.22 WRAN. In an embodiment, a system for sensing channel availability in a wireless network is provided. In another embodiment, the invention provides a computer program product which includes a computer readable medium. The computer readable medium includes instructions for sensing channel availability in a wireless network. In an alternative embodiment, the invention provides a method for sensing channel availability in a wireless network including a base station and a plurality of CPE's. Additionally, the method provides a technique that is compatible with conventional technology without substantial modifications to conventional equipment and processes. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention is directed in general to wireless telecommunication techniques. More particularly, the invention provides a method and system for sensing noncontiguous channels in a wireless network. Merely by way of example, the invention has been applied to a Wireless Regional Area Network (WRAN) system as defined in the IEEE 802.22 standard. But it would be recognized that the invention has a much broader range of applicability. For example, the invention can be applied to other wireless communication systems utilizing noncontiguous channels.

Figure 2:
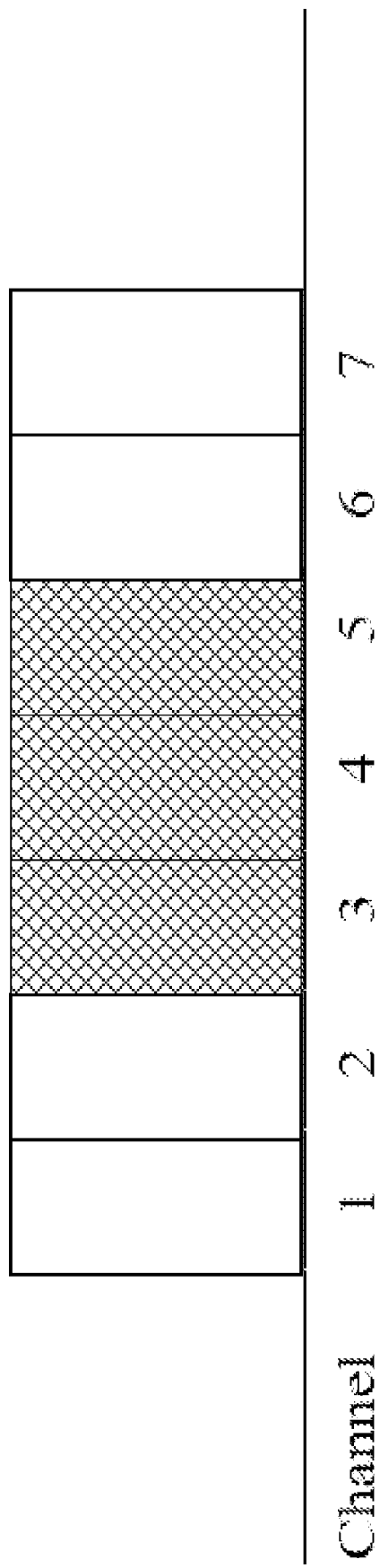
FIG. 2 is a simplified diagram illustrating a wireless channel spectrum.

As discussed above, channel sensing is carried out in a WRAN to identify available channels in a spectrum. FIG. 2 is a simplified diagram illustrating a wireless channel spectrum. This diagram is merely an example, which should not unduly limit the scope of the claims herein. One of ordinary skill in the art would recognize other variations, modifications, and alternatives. As shown, there are seven contiguous channels. In other words, seven channels 1-7 occupy adjacent bandwidths in the wireless frequency spectrum. Typically, a TV channel has a bandwidth of 6 MHz, although in some countries TV channels can have bandwidths of 7 or 8 MHz. In FIG. 2, TV signals or strong power incumbents are present in Channels 3, 4 and 5. If TV signals are present in these channels, the BS may spend very little or even no resource to sense these channels, since these incumbents are known a priori to be present. It is also possible that the incumbents are not fixed TV incumbents, but only strong incumbent signals which may leave after some time. For example, a television station's remote-news van, which is dispatched to somewhere in the WRAN cell, sends a signal back to the station. In this case, the BS does not have a priori information of its presence. Due to the strong signal of the incumbent, only a few CPE's are capable of detecting its presence very reliably. Most CPE's can then save the sensing period to sense the other channels whose statuses are more uncertain.

In other words, there are some channels that may be more or less important to sense than the others. Due to the limited resources for sensing, it is desirable to have an intelligent and flexible scheme to allocate more resource to those important channels. To facilitate this, the base station needs to specify discontiguous channels in different MAC/PHY stacks for consumer equipment premises to sense. For example, in the spectrum shown in FIG. 2, it may be desirable to sense channels 1, 2, 6, and 7. As shown, channels 1 and 2 are contiguous channels occupying adjacent frequency bandwidths, for example, 54-60 MHz and 60-66 MHz, respectively. Similarly, channels 6 and 7 are also contiguous channels occupying adjacent frequency bandwidths, for example, 84-90 MHz and 90-96 MHz, respectively. On the other hand, channels 2 and 6 are discontiguous, that is, their frequencies are not adjacent in the frequency spectrum.

As discussed above, four MAC management messages are often used for channel sensing, namely, Bulk measurement request (BLM-REQ), Bulk measurement response (BLM-RSP), Bulk measurement report (BLM-REP), and Bulk measurement acknowledgement (BLM-ACK). In the current draft of the IEEE 802.22 Standard the formats of these MAC management messages only support sensing for contiguous channels. An example of the BLM-REQ message format is shown below in Table 1.

TABLE 1

Conventional Bulk Measurement Request format

| Syntax | Size | Notes |
|---|---|---|
| BLM-REQ_Message_Format( ) { | | |
| Management Message Type = 39 | 8 bits | |
| Transaction ID | 16 bits | Shall be set to a nonzero value chosen by the BS sending the measurement request to identify the request/report transaction. |
| Starting Channel Number | 8 bits | |
| Number of Channels | 8 bits | |
| Confirmation Needed | 1 bit | Indicates whether or not the CPE is required by the BS to confirm, with a BLM-RSP message, the receipt of this message. 0 = No confirmation needed (default) 1 = Confirmation needed |
| Number of Single Measurement Requests | 3 bits | The number of single measurement requests contained in this message |
| Single Measurement Requests | Variable | A series of single measurement requests. |
| } | | |

As shown, the conventional BLM-REQ message provides Starting Channel Number and Number of Channels for selecting the target channels for sensing. For example, with Starting Channel Number=1 and Number of Channels=2, the target channels are channels 1 and 2. This method becomes inefficient, however, when the channels to be sensed are discontiguous. For example, using the conventional method to sense channels 1, 2, 6, and 7 in FIG. 2, two separate BLM-REQ message are required, one for channels 1 and 2 (with Starting Channel Number=1 and Number of Channels=2), and the other for channels 6 and 7 (with Starting Channel Number=6 and Number of Channels=2). Therefore, in the current specification of the IEEE 802.22 Standard, sensing discontinuous channel intervals increases system overhead. In particular, one BLM-REQ message can only facilitate one contiguous set of channels. Therefore, N BLM-REQ messages with almost identical contents are required to specify N discontiguous channel intervals, which can add heavy overheads to the system. Therefore it can be seen that an improved technique for channel sensing in wireless network, such as WRAN, is desired.

According to an embodiment of the present invention, a method is provided for wireless channel sensing. In a specific embodiment, an interval-basis channel list is provided in a request message. As a result, a plurality of measurement requests for sensing discontiguous channel intervals can be combined into one single request. An example of the message format according to an embodiment of the invention is shown in Tables 2 and 3 below.

TABLE 2

Bulk Measurement Request according to an embodiment of the invention

| Syntax | Size | Notes |
|---|---|---|
| BLM-REQ_Message_Format( ) { | | |
| Management Message Type = 39 | 8 bits | |
| Transaction ID | 16 bits | Shall be set to a nonzero value chosen by the BS sending the measurement request to identify the request/report transaction. |
| Interval-basis Channel List | Variable | Please refer to the Table 3 below. |
| Confirmation Needed | 1 bit | Indicates whether or not the CPE is required by the BS to confirm, with a BLM-RSP message, the receipt of this message. 0 = No confirmation needed (default) 1 = Confirmation needed |
| Number of Single Measurement Requests | 3 bits | The number of single measurement requests contained in this message |
| Single Measurement Requests | Variable | A series of single measurement requests. |
| } | | |

Table 2 shows a bulk measurement request messages according to an embodiment of the invention. When compared Table 1 and 2, the fields "Starting Channel Number" and "Number of Channels" in Table 1 are replaced by a new syntax "Interval-basis Channel List" in Table 2, which is used for identifying the channels that are either contiguous or discontiguous.

Table 3 below shows the message format of the Interval-basis Channel List according to an embodiment of the invention.

TABLE 3

Interval-basis Channel List according to an embodiment of the invention

| Syntax | Size | Notes |
|---|---|---|
| Interval_basis_Channel_List_Format( ) { | | |
| Starting Channel Number | 8 bits | The index of the starting channel |
| Number of Channels | 8 bits | The number of channels in the current interval |
| Linker | 1 bit | 1: The next 17 bits follow the interval-basis structure 0: The Channel List structure is terminated here |
| } | | |

It can be seen that the structure in Tables 2 and 3 adds only one bit to the current structure when only one group of contiguous channels are specified in the measurement request message, but it can save overheads when discontiguous channels are sensed. Merely as an example, a comparison can be made between the conventional method in Table 1 with the method in Tables 2 and 3 according to an embodiment of the invention. Referring to the channel spectrum diagram in FIG. 2, using the conventional method, two separate request messages are needed to request for sensing Channels 1 and 2, and Channels 6 and 7, respectively. In contrast, using the method provided by the embodiment shown in Tables 2 and 3, only a single measurement request message is needed, with an interval-basis channel list as follows.

1 (Starting Channel No. for interval #1)
2 (Starting Channel No. for interval #1)
1 (Linker, indicating more intervals to follow)
6 (Starting Channel No. for interval #2)
2 (Starting Channel No. for interval #2)
0 (Linker, indicating end of interval list)

The above method provides techniques for sensing channel availability in a wireless network according to an embodiment of the present invention. As shown, the method uses a BLM-REQ message in an IEEE 802.22 WRAN as an example to illustrate a message format for specifying discontiguous channels for sensing. Other alternatives can also be provided where other types of messages or other formats of message can be used without departing from the scope of the claims herein. The techniques can also be used in other types of communication networks. Further details of the present method can be found throughout the present specification and more particularly below.

In order to evaluate the performance of the techniques provided by embodiments of the invention, we have carried out simulation studies of the amount of system overhead (in terms of bits/second) required in the proposed bulk measurement request for channel sensing. For the simulation configurations, the bulk measurement request is event driven. In addition, when some incumbents appear in the sensing channels, this bulk measurement request is transmitted. The conditions for the simulation studies are shown as follows.

1. A CPE can sense N channels out of the 100 channels, namely, one is an in-band sensing channel and the others are out-of-band sensing channels selected from backup channels.
2. The CPE sends its report (BLM-REP) to the BS once per 2 seconds.
3. TV channels are randomly distributed.
4. Part 74 incumbents appear with a probability P in each channel.
5. The presence state of the Part 74 incumbents in each channel changes slowly.
6. The probability of an incumbent user detected in the channel which is clean in the last report (BLM-REP) is Pc.
7. The measurement is event-driven, i.e., when a channel occupancy changes, a request for sensing is made.

In the above, Part 74 incumbents are known in the art to refer to certain low-powered licensed devices such as wireless microphones and intercoms.

Figure 3:
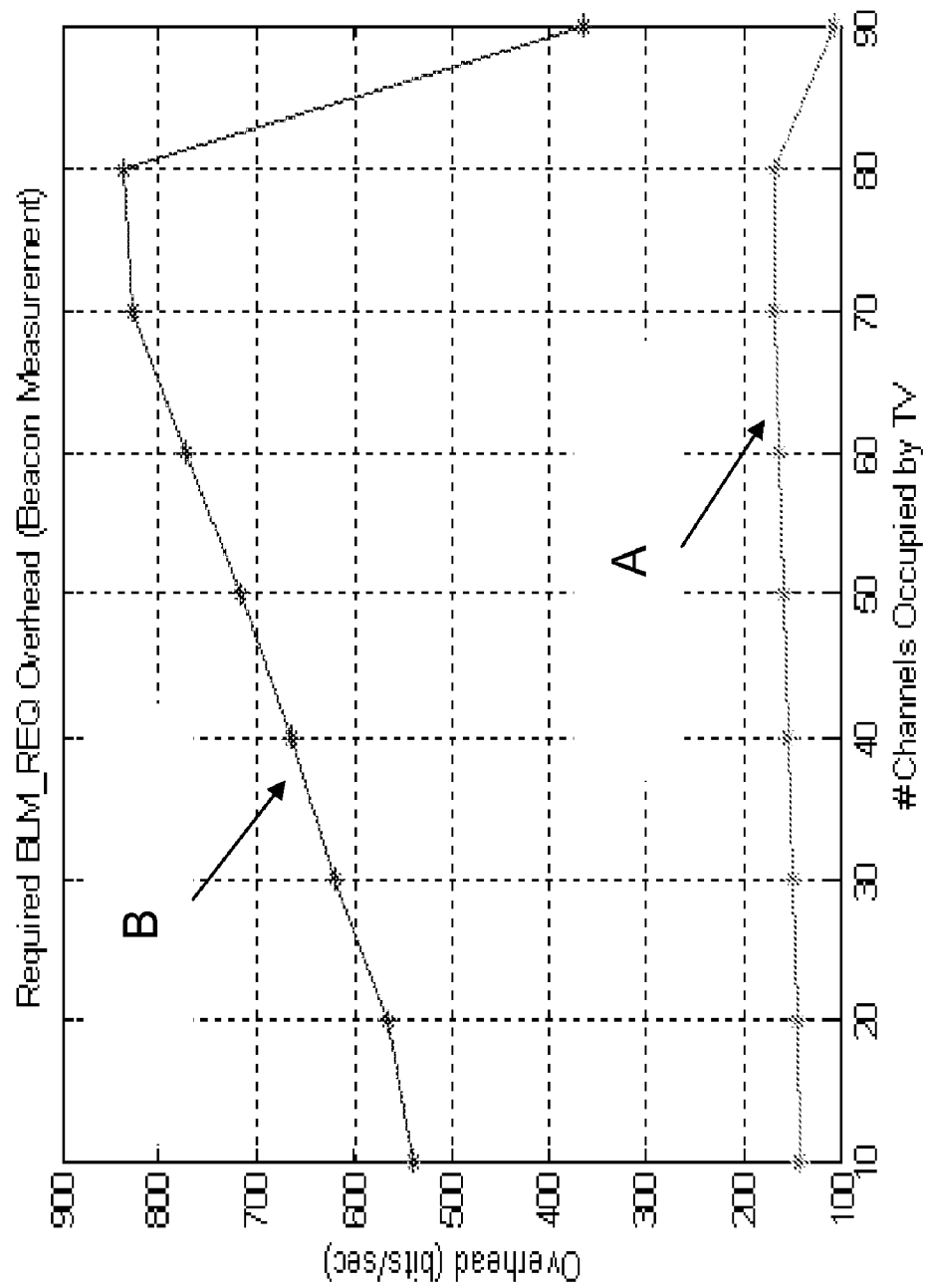
FIG. 3 is a simplified diagram comparing channel sensing overhead of a method according to an embodiment of the present invention with a conventional method.

FIG. 3 is a simplified diagram comparing channel sensing overhead of a method according to an embodiment of the present invention with a conventional method. This diagram is merely an example, which should not unduly limit the scope of the claims herein. One of ordinary skill in the art would recognize other variations, modifications, and alternatives. As shown, channel sensing overhead is measure for the case in which N=10 and Pc=0.1. That is, the CPE has the capability to sense 10 channels, and the probability of an incumbent user being detected in a channel is 0.1. In FIG. 3, the overhead (measured in bits/sec) is plotted against the number of channels occupied by TV stations. Curve A represents the overhead for an embodiment of the invention, whereas curve B represents the overhead for a conventional method. For example, at horizontal axis=10, 10 channels are being occupied by TV stations, and 90 channels are potentially available for sensing. The BS selects 10 channels and issue requests to the CPE to perform sensing. Depending on the distribution of these 10 channels, using the conventional method, it may take several such requests, whereas only one request is used according to embodiments of the invention. As another example, at horizontal axis 60, only 40 channels are potential candidates for sensing, and the likelihood of contiguous channels is lower than when there are 90 potential candidates. As shown in FIG. 3, the overhead increases sharply for the conventional method as the number of incumbents increases and available candidates are more likely to be discontiguous. In contrast, substantial reduction in system overhead in obtained using the technique provided by embodiments of the present invention.

Figure 4:
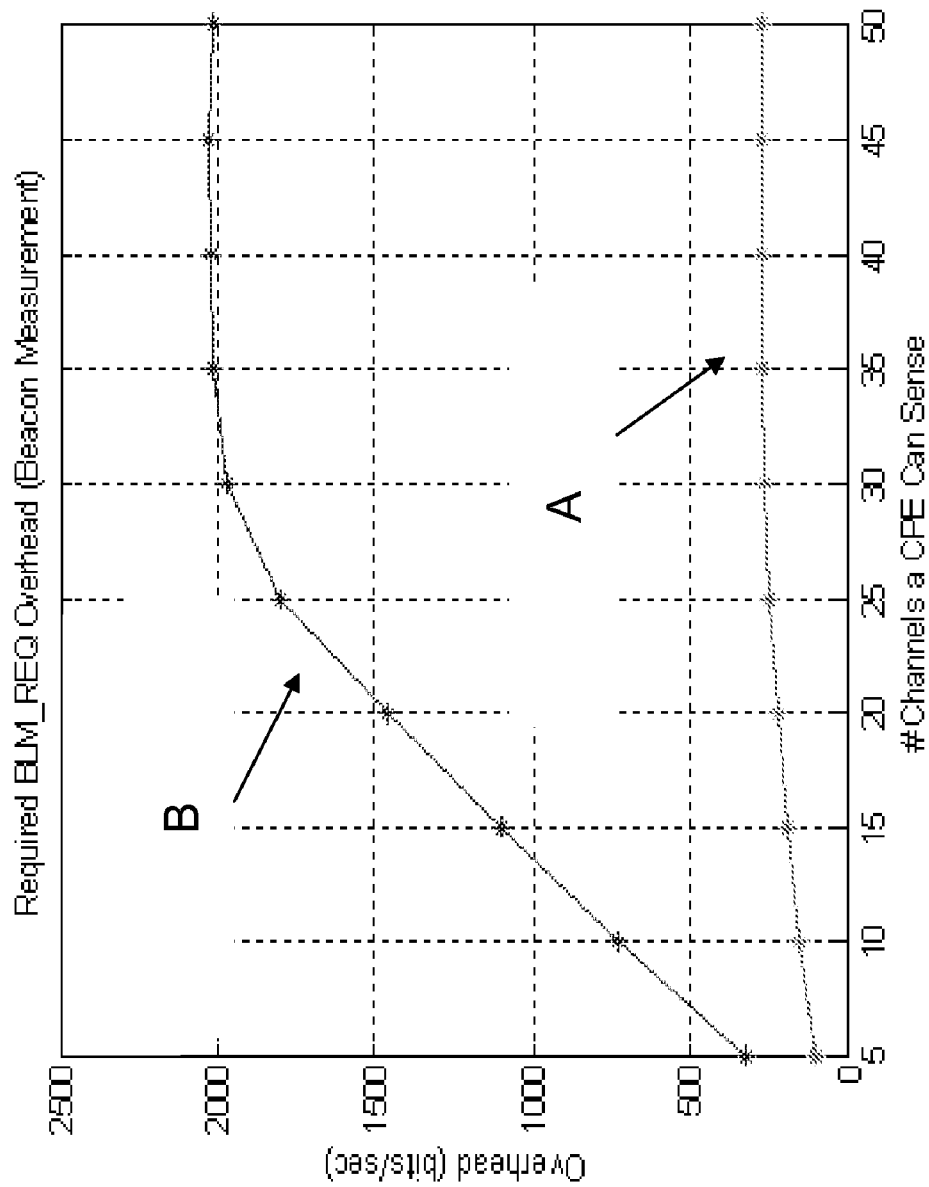
FIG. 4 is another simplified diagrams comparing channel sensing overhead of a method according to an embodiment of the present invention with a conventional method.
Figure 5:
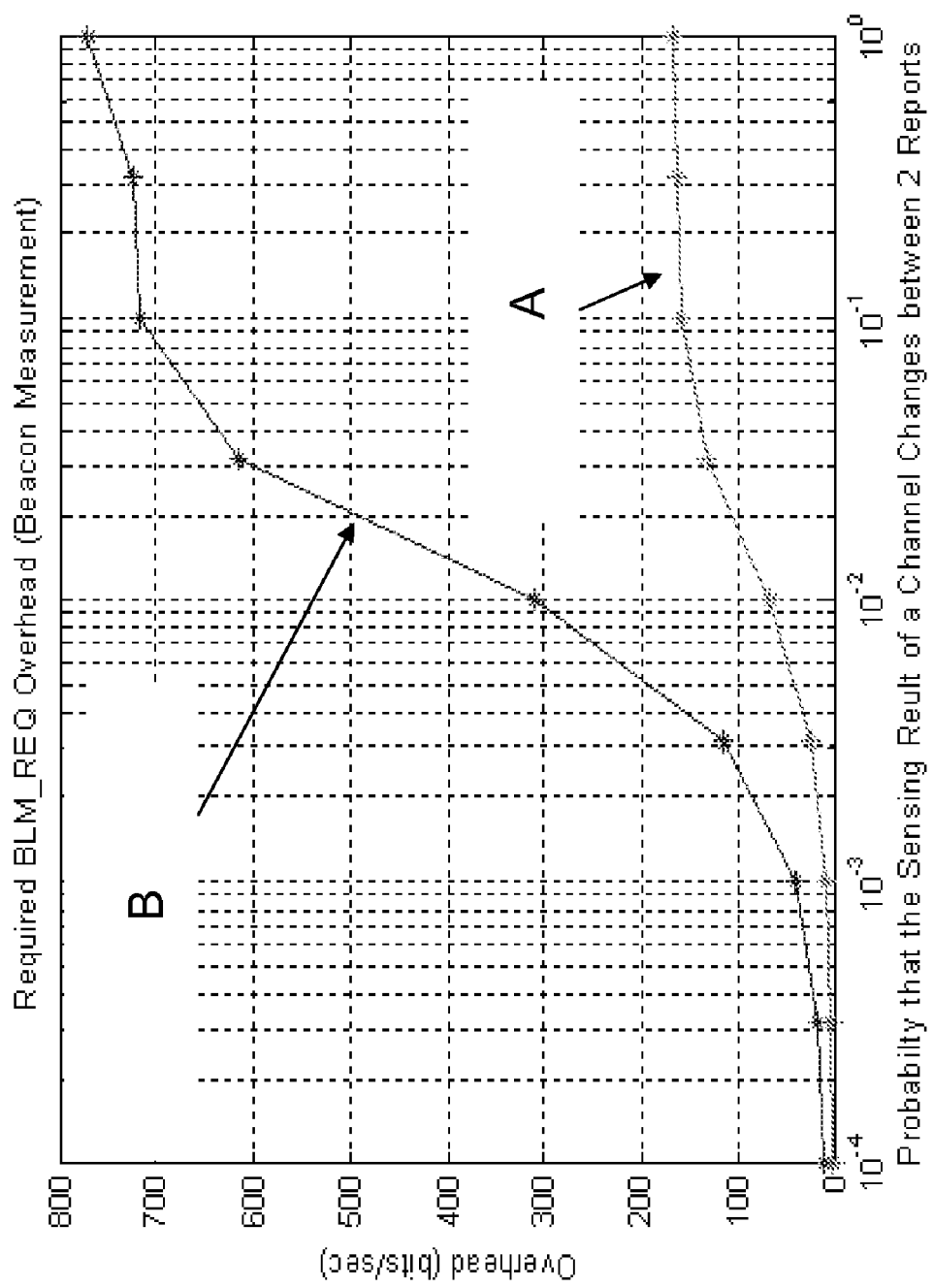
FIG. 5 is yet another simplified diagrams comparing channel sensing overhead of a method according to an embodiment of the present invention with a conventional method.

FIGS. 4 and 5 are additional simplified diagrams comparing channel sensing overhead of a method according to an embodiment of the present invention with a conventional method. These diagrams are merely an example, which should not unduly limit the scope of the claims herein. In both FIGS. 4 and 5, Curve A is the overhead for an embodiment of the invention, whereas curve B is the overhead for a conventional method. FIG. 4 shows another set of simulation results for Pc=0.1 given there are 50 channels occupied by TV stations. As shown, when the CPE is capable of sensing more channels, the system overheads of the original bulk measurement request increase dramatically. It is as expected because N BLM-REQ messages with almost identical contents are required to specify N discontiguous channel intervals. On the other hand, it can be observed that by using the proposed MAC management message in the embodiment of the invention, the system overhead is significantly reduced. Similar results can be concluded in FIG. 5, which shows the system overhead comparison between the original and the proposed designs for N=10 given there are 50 channels occupied by TV stations.

Figure 6:
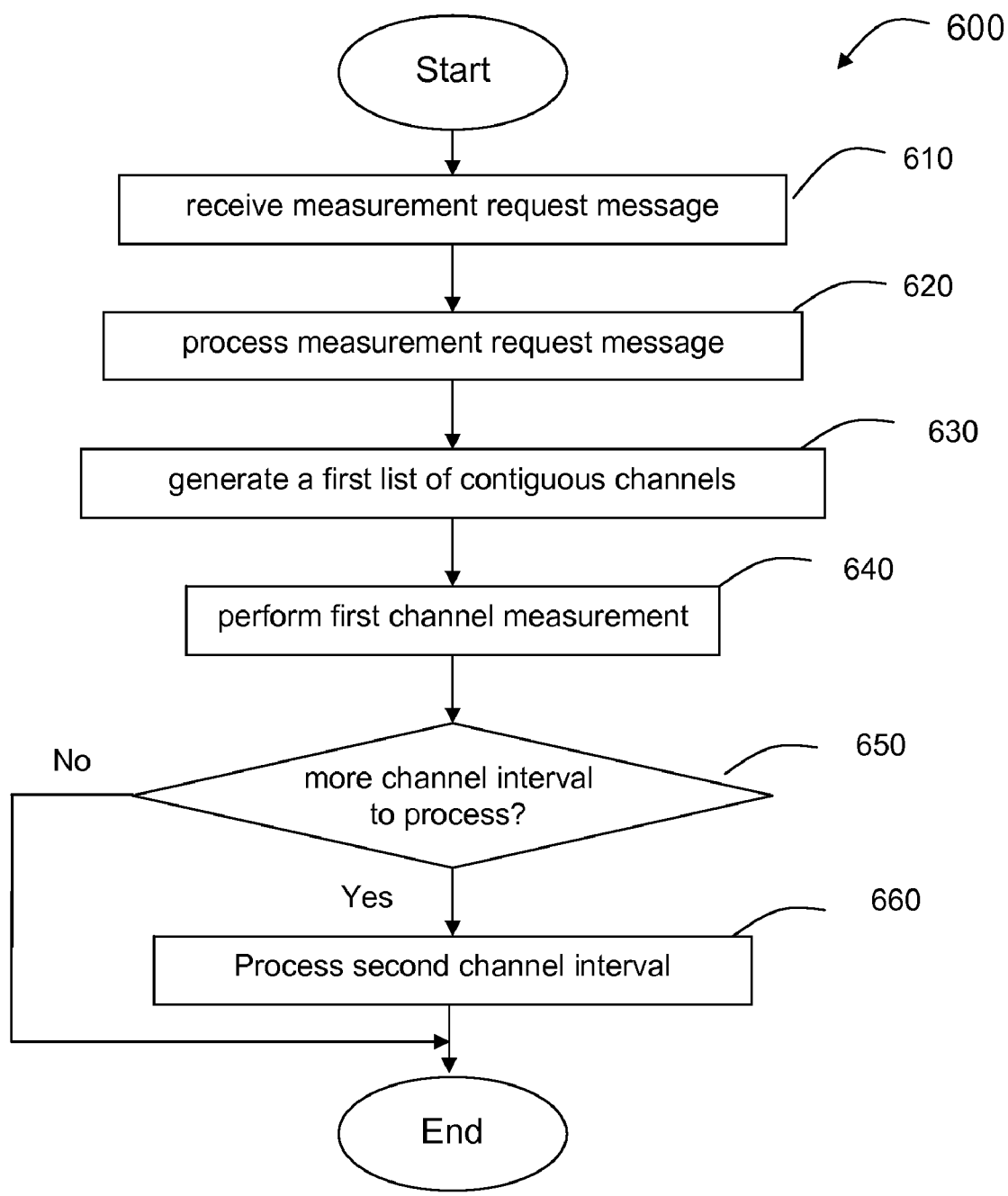
FIG. 6 is a simplified flow diagram 600 of a method for sensing channel availability in a wireless network according to an embodiment of the present invention.

FIG. 6 is a simplified flow diagram 600 of a method for sensing channel availability in a wireless network according to an embodiment of the present invention. This diagram is merely an example, which should not unduly limit the scope of the claims herein. One of ordinary skill in the art would recognize other variations, modifications, and alternatives. The method can be briefly outlined below.

1. (Process 610) Receive measurement request message;
2. (Process 620) Process measurement request message;
3. (Process 630) Generate a first list of contiguous channels;
4. (Process 640) Perform first channel measurement;
5. (Process 650) Determine if there are more channel interval to process; and
6. (Process 660) If there are more channel intervals to process, process the second channel interval.

As shown, in Process 610, the method includes receiving a measurement request message, which includes a channel interval list. In an embodiment, the channel interval list includes at least a first channel interval, which includes several fields. For example, a first field is associated with a first starting channel number, a second field is associated with a first number of channels, and a third field is associated with first linkage information of the channel interval list.

The method is applicable in many different wireless networks according to embodiments of the invention. As a specific example, the wireless network may an IEEE 802.22 Wireless Regional Area Network (WRAN). In this example, the measurement request message includes a bulk measure request (BLM-REQ) message. In an embodiment, BLM-REQ message includes a list of channel intervals, each of the channel intervals including a first field associated with a first starting channel number, a second field associated with a first number of channels, and a third field associated with first linkage information of the list of channel intervals. In a specific embodiment, the BLM-REQ message includes a list of channel intervals, each of the channel intervals including an first 8-bit field associated with a first starting channel number, a second 8-bit field associated with a first number of channels, and a 1-bit field associated with first linkage information of the list of channel intervals. Of course, there can be other variation, modifications, and alternatives.

In Process 620, the method includes processing information associated with the measurement request message, and in Process 630, the method includes generating a first list of contiguous channels based on at least information associated the first field and the second field associated with the first channel interval in the channel interval list. Referring the channel frequency spectrum in FIG. 2 as an example, the first list of contiguous channels includes channels 1 and 2. In Process 640, at least first channel measurement is performed to determine a first channel availability for each of the first list of contiguous channels.

In Process 650, the method determines whether the channel interval list further includes a second channel interval that needs to be processed based on at least first linkage information. For example, in a specific embodiment, the third field may be a 1-bit field, and a "1" in the third field indicates at least one more channel interval to be processed, and a "0" in the third field indicates an end of the channel interval list. In the example associated with FIG. 2, the third field is "1" indicating that another list is available. In Process 660, if the channel interval list is determined to further include the second channel interval that needs to be processed, the method then generates a second list of contiguous channels and performs at least second channel measurement to determine a second channel availability for each of the second list of contiguous channels.

In a specific embodiment, the second channel interval includes a fourth field associated with a second starting channel number, a fifth field associated with a second number of channels, and a sixth field associated with second linkage information of the channel interval list. Referring to FIG. 2, the second starting channel would be 6, the second number of channels would be 2, and the sixth field would be "0" indicating the end of the channel interval list. Here, the generating a second list of contiguous channels is performed based on at least information associated the fourth field and the fifth field associated with the second channel interval in the channel interval list. In FIG. 2, the second list of contiguous channels includes channels 6 and 7. In processing the second channel interval, the method also includes determining whether the channel interval list further includes a third channel interval that needs to be processed based on at least second linkage information. In the example of FIG. 2, the "0" in the sixth field indicates that no more channel intervals need to be processed.

In another embodiment, a method for sensing channel availability in a wireless network also includes sending a channel sensing report to a base station. In a specific embodiment, the wireless network is an IEEE 802.22 Wireless Regional Area Network (WRAN), and the channel sensing report is sent via is a bulk measure report (BLM-REP) message.

The above sequence of processes provides sensing channel availability in a wireless network according to an embodiment of the present invention. As shown, the method uses a combination of processes including a way of receiving a list of discontiguous channel intervals in a single message and processing each channel interval. Other alternatives can also be provided where processes are added, one or more processes are removed, or one or more processes are provided in a different sequence without departing from the scope of the claims herein. Further details of the present method can be found throughout the present specification and more particularly below.

Figure 1:
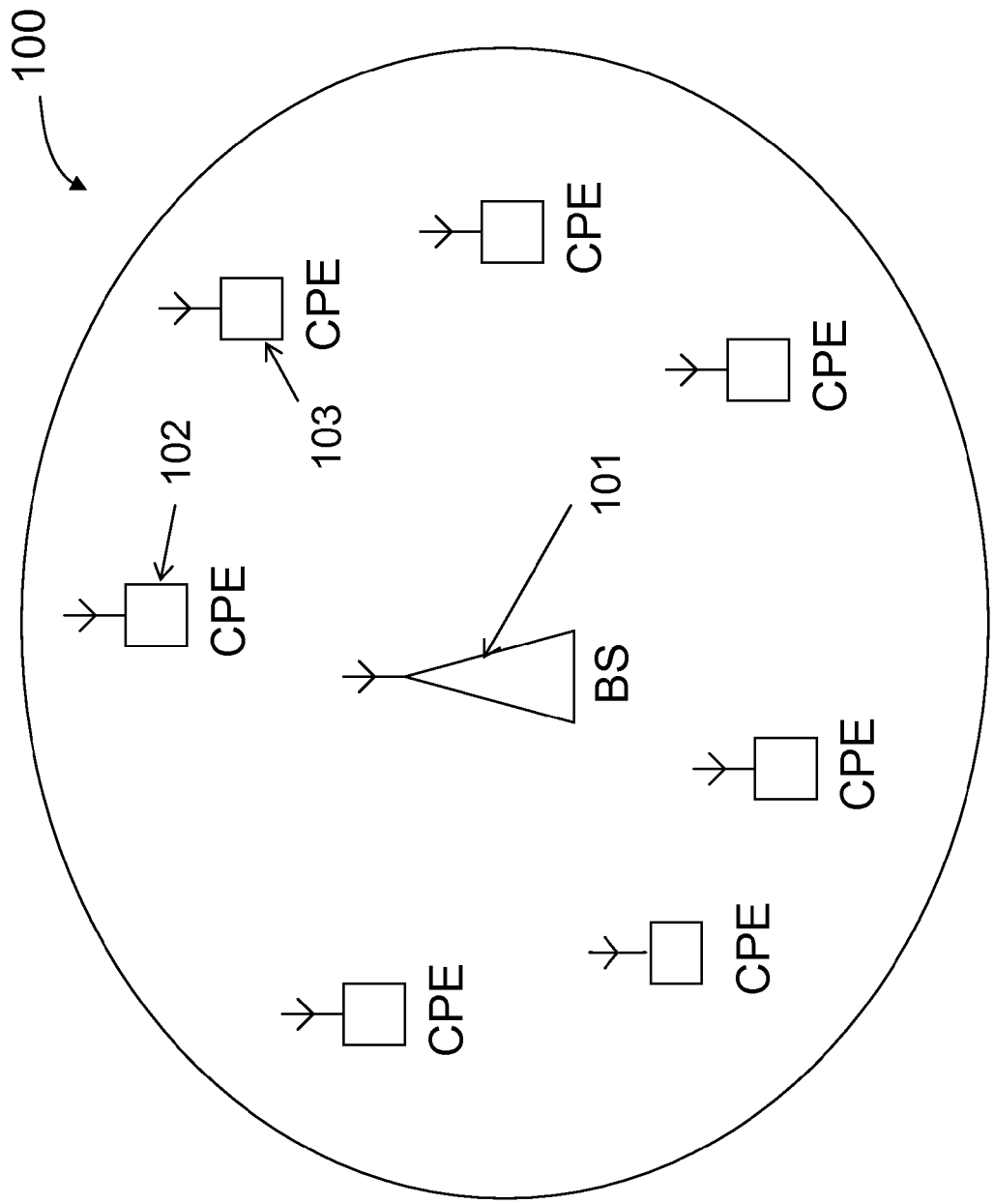
FIG. 1 shows a diagram illustrating a WRAN cell including a BS and a plurality of CPE's.
Figure 7:
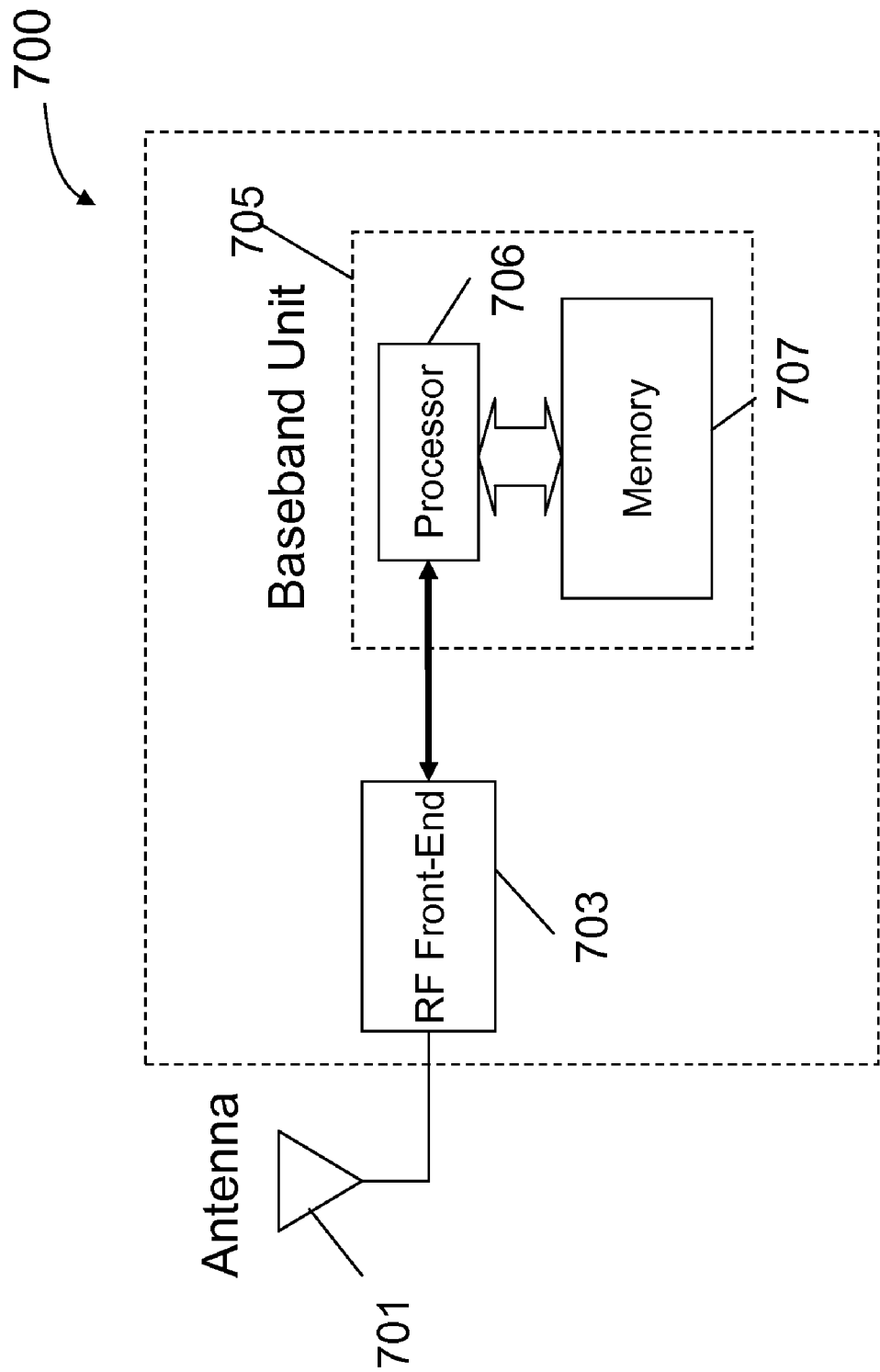
FIG. 7 is a simplified block diagram illustrating a wireless system according to an embodiment of the invention.

According to another embodiment of the invention, a system is provided for sensing channel availability in a wireless network. For example, the wireless network may be a WRAN according to IEEE 802.22, as shown in FIG. 1, and the system may be a CPE, for example, an access point, among others. FIG. 7 is a simplified block diagram illustrating a wireless system, e.g., a CPE, according to an embodiment of the invention. As shown, wireless system 700 includes an antenna 701, an RF front-end apparatus 703, and a Baseband unit 705. The Baseband unit 705 includes at least a processor 706 and a memory 707. In a specific embodiment, the system includes components for sensing channel availability in a wireless network. For example, the system includes one or more components configured to receive a measurement request message, which includes a channel interval list. The channel interval list includes at least a first channel interval. In an embodiment, the first channel interval includes a first field associated with a first starting channel number, a second field associated with a first number of channels, and a third field associated with first linkage information of the channel interval list. The system includes one or more components configured to process information associated with the measurement request message, and to generate a first list of contiguous channels based on at least information associated the first field and the second field associated with the first channel interval in the channel interval list. The system also includes one or more components configured to perform at least first channel measurement to determine a first channel availability for each of the first list of contiguous channels. The system further includes one or more components configured to determine whether the channel interval list further includes a second channel interval that needs to be processed based on at least first linkage information. The system includes one or more components configured to generate a second list of contiguous channels and perform at least second channel measurement to determine a second channel availability for each of the second list of contiguous channels, if the channel interval list is determined to further include the second channel interval that needs to be processed.

In a specific embodiment of the system, the second channel interval includes a fourth field associated with a second starting channel number, a fifth field associated with a second number of channels, and a sixth field associated with second linkage information of the channel interval list. In an embodiment, the generating a second list of contiguous channels is performed based on at least information associated the fourth field and the fifth field associated with the second channel interval in the channel interval list. In an embodiment, the system further includes one or more components configured to determine whether the channel interval list further includes a third channel interval that needs to be processed based on at least second linkage information. In another embodiment, the system also includes one or more components configured to send a channel sensing report to a base station. In a specific embodiment, the wireless network is IEEE 802.22 WRAN, and the measurement request message is specific in the BLM-REQ message as shown in Tables 2 and 3. In the WRAN, the channel sensing report is sent via is a bulk measure report (BLM-REP) message.

Although the above has been shown using a selected group of components for the a system for determining channel availability in a wireless network, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification. Merely as an example, the system can be implemented according to one or more of FIGS. 6-7 and Tables 2-3. Of course, there can be other variations, alternatives, and modifications.

In an alternative embodiment, the invention provides a computer program product which includes a computer readable medium. The computer readable medium includes instructions for sensing channel availability in a wireless network. In a specific embodiment, the computer readable medium includes the following:

1. one or more instructions for receiving a measurement request message, the measurement request message including a channel interval list, the channel interval list including at least a first channel interval, the first channel interval including a first field associated with a first starting channel number, a second field associated with a first number of channels, and a third field associated with first linkage information of the channel interval list;
2. one or more instructions for processing information associated with the measurement request message;
3. one or more instructions for generating a first list of contiguous channels based on at least information associated the first field and the second field associated with the first channel interval in the channel interval list;
4. one or more instructions for performing at least first channel measurement to determine a first channel availability for each of the first list of contiguous channels;
5. one or more instructions for determining whether the channel interval list further includes a second channel interval that needs to be processed based on at least first linkage information; and
6. one or more instructions for generating a second list of contiguous channels and performing at least second channel measurement to determine a second channel availability for each of the second list of contiguous channels, if the channel interval list is determined to further include the second channel interval that needs to be processed.

In a specific embodiment of the computer program product, the wireless network is an IEEE 802.22 Wireless Regional Area Network (WRAN) and the measurement request message includes a bulk measure request (BLM-REQ) message. In an embodiment, the bulk measure request (BLM-REQ) message includes a list of channel intervals, each of the channel intervals including an first field associated with a first starting channel number, a second field associated with a first number of channels, and a third field associated with first linkage information of the list of channel intervals. In another embodiment, method for sensing channel availability in a wireless network also includes sending a channel sensing report to a base station. In a specific embodiment, the wireless network is an IEEE 802.22 Wireless Regional Area Network (WRAN), and the channel sensing report is sent via is a bulk measure report (BLM-REP) message.

Although the above has been illustrated in terms of specific computer software instruction features, it would be recognized that many variations, alternatives, and modifications can exist. For example, any of the software features can be further combined, or even separated. The software can be further integrated or less integrated depending upon the application. Further details of certain methods according to the present invention can be found throughout the present specification. As an example, the computer program product can be implemented according to one or more of FIGS. 6-7 and Tables 2-3. Referring to FIG. 7, in a specific embodiment, the instructions in the computer program product may reside in the memory 707 and executed by processor 705 of wireless system 700. Of course, there can be other variations, alternatives, and modifications.

In yet another embodiment, the invention provides a method for determining channel availability by a base station in a wireless network. In the method, the base station selects a CPE from a plurality of CPE's. The base station forms a measurement request message, which includes a channel interval list. The channel interval list includes one or more channel intervals, each of the one or more channel intervals including a first field associated with a staring channel number, a second field associated with a number of channels, and a third field associated with linkage information of the interval-basis channel list. The method includes sending the measurement request message to the CPE. The base station then receives a channel sensing report from the CPE. In a specific embodiment, the wireless network is IEEE 802.22 WRAN, and the measurement request message is specific in the BLM-REQ message as shown in Tables 2 and 3. In the WRAN, the channel sensing report is sent via is a bulk measure report (BLM-REP) message.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for use by a customer premise equipment (CPE) in determining channel availability in a wireless network, the method comprising:
   receiving, by the CPE, a measurement request message from a base station (BS), wherein the measurement request message comprises a channel interval list that comprises at least a first section corresponding to a first interval of contiguous channels, wherein the first section comprises a first starting-channel number of the first interval of contiguous channels, a first number of channels corresponding to the total number of channels in the first interval of contiguous channels, and a first linker;
   performing, by the BS, a first channel measurement to determine channel availability for each channel in the first interval of contiguous channels;
   determining, by the BS, whether the channel interval list further comprises a second section corresponding to a second interval of contiguous channels based on the first linker; and
   if the channel interval list further comprises the second section, then performing, by the BS, a second channel measurement to determine channel availability for each channel in the second interval of contiguous channels.

2. The method of claim 1, wherein the BS determines that the channel interval list comprises the second section, and wherein the second section comprises a second starting channel number of the second interval of contiguous channels, a second number of channels corresponding to the total number of channels in the second interval of contiguous channels, and a linker.

3. The method of claim 2, further comprising:
   determining, by the BS, whether the channel interval list further comprises third section corresponding to a third interval of contiguous channels based on the second linker; and if the channel interval list further comprises the third section, then performing a third channel measurement to determine channel availability for each channel in the third interval of contiguous channels.

4. The method of claim 1, further comprising:
composing a channel sensing report that is based on either the first channel measurement or a combination of the first channel measurement and the second channel measurement; and
sending the channel sensing report to the BS.

5. The method of claim 4, wherein the wireless network is an Institute of Electrical and Electronics Engineers (IEEE) 802.22 Wireless Regional Area Network (WRAN),
wherein the measurement request message is a bulk measure request (BLM-REO) message, and
wherein the channel sensing report is sent via a bulk measure report (BLM-REP) message.

6. A costumer premises equipment (CPE) configured to determine channel availability in a wireless network, the CPE comprising:
a receiving unit configured to:
receive a measurement request message from the BS comprising a channel interval list that comprises at least a first section corresponding to a first interval of contiguous channels, wherein the first section comprises a first, starting channel number of the first interval of contiguous channels, a first number of channels corresponding to the total number channels in the first contiguous channels and a first linker; and
a processing unit, configured to:
perform a first channel measurement to determine channel availability for each channel in the first interval of contiguous channels;
determine whether the channel interval list further comprises a second section corresponding to a second interval of contiguous channels based on the first linker; and
if the channel interval list further comprises the second section, then perform a second channel measurement to determine channel availability for each channel in the second interval of contiguous channels.

7. The CPE of claim 6, wherein the processing unit is further configured to:
determine whether the channel interval list further comprises a third section corresponding to a third interval of contiguous channels the second linker; and
if the channel interval lists further comprises the third section, then perform a third channel measurement to determine channel availability for each channel in the third interval of contiguous channels.

8. The CPE of claim 6, wherein the processing unit is further configured to: compose a channel sensing report based on either the first channel measurement or a combination of the first channel measurement and the second channel measurement, and
wherein the CPE further comprises a sending unit configured to send the channel sensing report to the BS.

9. The CPE of claim 6, wherein the receiving unit comprises an antenna and a radio frequency (RF) front-end apparatus, and
wherein the processing unit comprises a processor and a memory drive.

10. A computer program product comprising a computer readable non-transient medium configured to store instructions for determining channel availability in a wireless network by a customer premises equipment (CPE), wherein the instructions comprise:

a first set of instructions for receiving, by the CPE, a measurement request message from a Base Station (BS), wherein the measurement request message comprises a channel interval list that comprises at least a first section corresponding to a first interval of contiguous channels, and wherein the first section comprises a first starting channel number of the first interval of contiguous channels, a first number of channels corresponding to the total number of channels in the first interval of contiguous channels, and a first linker;
a second set of instructions for performing a first channel measurement to determine channel availability for each channel in the first interval contiguous channels; and
a third set of instructions for determining whether the channel interval list further includes a second section that corresponds to a second interval of contiguous channels based on the first linker,
wherein if the channel interval list further includes a second section, then the instructions further comprise a fourth set of instructions for performing a second channel measurement to determine channel availability for each channel in the second interval of contiguous channels.

11. The computer program product of claim 10, wherein the instructions further comprise:
a fifth set of instructions for composing a channel sensing report based on either the first channel measurement or a combination of the first channel measurement and the second channel measurement; and
a sixth set of instructions for sending the channel sensing report to the BS.

12. A method for determining channel availability in a wireless network, the method comprising:
receiving, by a customer premise equipment (CPE), a measurement request message from a base station (BS) comprising a channel interval list that comprises at least a first section corresponding to a first interval, of contiguous channels, wherein the first section comprises a first starting channel number of the first interval of contiguous channels, a first number of channels corresponding to the total number of channels in the first interval of contiguous channels, and a first linker;
performing, by the CPE, a first channel measurement to determine channel availability for each channel in the first interval of contiguous channels; and
determining whether the channel interval list further comprises a second section corresponding to a second interval of contiguous channels based on the first linker, wherein the second section comprises: a second starting channel number of the second interval of contiguous channels; a second number of channels corresponding to the total number of channels in the second interval of contiguous channels, and a second linker; and
wherein if the channel interval list comprises the second section then the method further comprises:
performing a second channel measurement to determine channel availability for each channel in the second interval of contiguous channels; and
determining whether the channel interval list further comprises a third section corresponding to a third interval of contiguous channels based on the second linker.

13. The method of claim 1, wherein the first starting channel number is indicated by a first field of the measurement request message that comprises eight bits, wherein the number of channels in the first interval of the contiguous channels is indicated by a second field of the measurement request message that comprises eight bits, and wherein the first linker is indicated by a third field of the measurement request message that comprises one bit.

14. The CPE of claim 6, wherein the second section comprises: a second starting channel number of the second interval of contiguous channels; a second number of channels corresponding to the total number of channels in the second interval of contiguous channel, and a second linker.

* * * * *

UNITED STATES PATENT AND TRADEMARK OFFICE
CERTIFICATE OF CORRECTION

| | | |
|---|---|---|
| PATENT NO. | : 8,081,972 B2 | Page 1 of 1 |
| APPLICATION NO. | : 11/753675 | |
| DATED | : December 20, 2011 | |
| INVENTOR(S) | : Wing Chau Chan et al. | |

It is certified that error appears in the above-identified patent and that said Letters Patent is hereby corrected as shown below:

Column 12, line 62 should read "a second linker"

Column 13, line 18 "Costumer" should be changed to "Customer"

Column 13, line 15 should read "sure request (BLM-REQ) message, and"

Column 13, line 26 should not have a comma after "first" and should read "prises a first starting channel number of the first inter-"

Column 13, line 29 "interval of" was omitted. The line should read "interval of contiguous channels and a first linker; and"

Column 13, line 62 should read "memory device"

Signed and Sealed this
Twenty-eighth Day of February, 2012

David J. Kappos
*Director of the United States Patent and Trademark Office*